United States Patent

[11] 3,602,205

| [72] | Inventor | Michael C. Turkish |
| | | Lyndhurst, Ohio |
| [21] | Appl. No. | 824,169 |
| [22] | Filed | May 13, 1969 |
| [45] | Patented | Aug. 31, 1971 |
| [73] | Assignee | Eaton Yale & Towne, Inc. |
| | | Cleveland, Ohio |

[54] DUAL BEAM VALVE SPRING
8 Claims, 24 Drawing Figs.

[52] U.S. Cl. ............................................. 123/90.65,
123/90.43, 123/90.44, 267/47, 267/158
[51] Int. Cl. ..................................................... F01l 3/10,
F16f 1/18
[50] Field of Search............................................ 123/90,
188, 90.65, 90.66, 90.67; 267/41, 47, 158, 159

[56] References Cited
UNITED STATES PATENTS

| 285,324 | 9/1883 | Vose | 267/47 |
| 1,227,812 | 5/1917 | MacPherson | 123/90 |
| 1,408,781 | 3/1922 | Sewell | 123/90 |
| 1,844,088 | 2/1932 | Davis | 267/41 |
| 2,184,381 | 12/1939 | Figgie et al. | 267/47 |
| 2,217,549 | 10/1940 | Hemmingsen | 123/188 |
| 2,608,752 | 9/1952 | Schilling | 267/47 X |
| 3,145,984 | 8/1964 | Hallam | 267/47 |
| 3,445,911 | 5/1969 | Stamm | 267/47 X |

FOREIGN PATENTS

| 122,379 | 1/1919 | Great Britain | 123/90 |
| 450,054 | 7/1949 | Italy | 123/90 |

*Primary Examiner*—Al Lawrence Smith
*Attorney*—Teagno & Toddy

ABSTRACT: A valve spring, comprising an elastic beam in bending, having a high natural vibration frequency to practically eliminate the presence of spring surge, as encountered with the common helical coil spring in high-speed internal combustion engine valve gear. The natural vibration frequency of the beam spring is considerably higher than the helical coil spring which it replaces, being about two to four times greater. The beams have novel shape and are designed to have a high and relatively uniform maximum stress in the flexed region. Dual beams are used to provide an assembly to operate each individual valve. Further, the adaptability and the low profile can decrease the required engine height or make possible the use of the invention in heavy duty engines for improved valve stem cooling.

PATENTED AUG 31 1971 3,602,205

INVENTOR.
MICHAEL C. TURKISH
BY
ATTORNEYS

NOMENCLATURE

D — SPRING DEFLECTION, INCHES
E — MODULUS OF ELASTICITY, #/IN.²
F — SPRING FREQUENCY, CYCLES/MIN.
I — SECTION MOMENT OF INERTIA, IN.⁴
L — SPRING LENGTH, INCHES
M — BENDING MOMENT = P·L, #·IN.
P — APPLIED FORCE* = POUNDS, #
R — DUAL SPRING RATE, #/IN.
S — MAX. TENSILE STRESS, #/IN.²
T — MAX. SPRING THICKNESS, INCHES
W — WIDTH OF ONE BEAM OF PAIR, INCHES
Z — SURFACE TO AXIS DISTANCE, INCHES

* — TOTAL FORCE APPLIED TO A DUAL BEAM SPRING

DUAL BEAM SPRING DESIGN FORMULAS

$$R = \frac{P}{D} = \frac{E \cdot W \cdot T^3}{4.3 \cdot L^3}$$

$$S = \frac{M \cdot Z}{I} = \frac{3.1 \cdot L \cdot P}{W \cdot T^2}$$

$$F = \frac{6.6 \cdot 10^6 \cdot T}{L^2}$$

Fig. 20

INVENTOR.
MICHAEL C. TURKISH
BY
*Teagno & Toddy*
ATTORNEYS

DUAL BEAM VALVE SPRING

Figure 1:
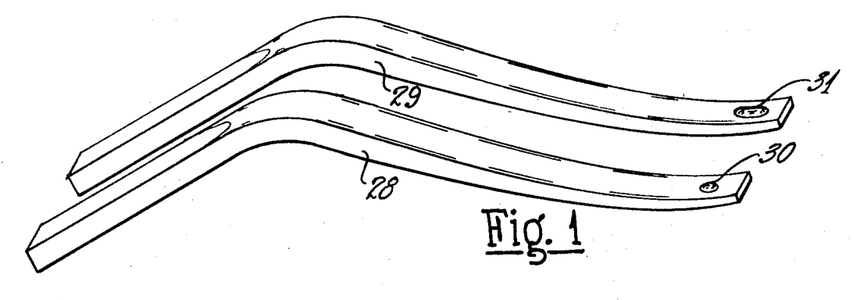
FIG. 1 is a perspective view of the invention comprising a pair of cantilever beam springs for use as the valve return spring, being part of the valve gear in any form of combustion engine.

This invention relates to a valve spring structure, illustrated in FIG. 1 of the drawings of this disclosure, for combustion engines and more particularly to a dual beam valve spring that is effective in practically eliminating spring surge at substantially all engine operating speeds, thereby providing a substantial improvement in engine operation with reduced noise due to improved high-speed valve gear dynamics.

Figure 2:
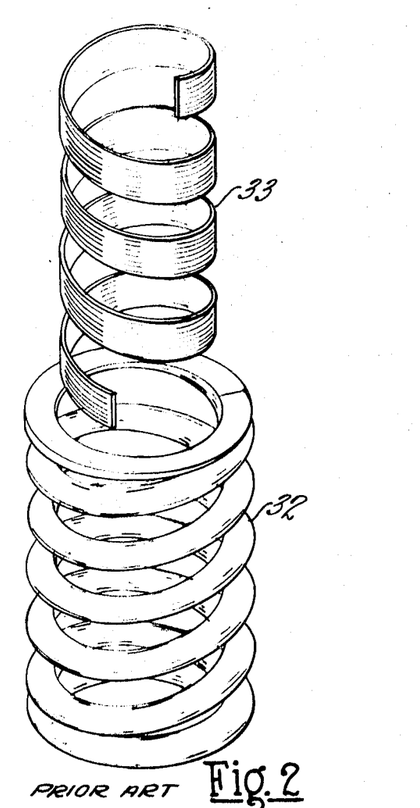
FIG. 2 is an exploded perspective view of a conventional prior art helical coil spring as used in the valve gear for an internal combustion engine and shows an internal helical coil flat wire damper for optional use in the spring.

The prior art has employed helical coil valve springs with internally mounted dampers, as illustrated in FIG. 2, as the most reasonable compromise from the standpoints of facility of manufacture, economy of production and attainment of modest engine performance. Although multiple-leaf cantilever beam springs are disclosed by the early literature, they have not been successfully employed for valve spring use and were superseded by the helical coil springs. At the present time it is not known that there are any commercially built engines utilizing beam valve springs or multiple-leaf vale springs in any form.

One multiple-leaf valve spring has been disclosed in the prior art in U.S. Pat. No. 2,217,549 to Hemmingsen. The spring there disclosed is of U-shaped configuration in a side elevational view and is pivoted at the bight portion of the U— the region of greatest mass. This is a multiple-leaf construction. The patent also explains the need for a high natural frequency of vibration of this spring so as to be above the influence of the periodic impulses of the cam. This patent does not offer a solution to obtain such a high frequency spring since the heaviest part of the spring is in the middle of the U, which is pivoted and free to move, resulting in a low spring frequency instead.

Helical coil springs operate reasonably satisfactorily in low speed engines, and have modified and improved gradually by the use of better steels, processing methods, etc., as the speeds of engines have gradually and consistently increased with the progress of the art. However, it is known that at high engine speeds, helical coil springs will surge severely, particularly at certain speeds when the valve spring is excited into resonance at its natural frequency by a cam harmonic. The nature and cause of spring surge is well understood and thoroughly documented in engineering literature. Suffice it to briefly explain that a cam lift profile can be likened to a combination of sinusoidal displacement curves of the fundamental frequency and all higher integer multiple harmonics. The sum of all these harmonic curves then produces the periodic cam lift curve. It is also known that the amplitude of these harmonics generally gradually decrease with increasing frequency.

The usual helical coil valve spring frequencies, at the present state of the art, are in the range of 18,000 to 30,000 cycles per minute and are used in maximum (4 cycle) engine speeds of 4,000 to 7,000 r.p.m. With camshaft speeds at 2,000 to 3,500 r.p.m. the lowest cam harmonics encountered are in a range of 7 through 11 and it is these lower orders which excite the spring into severe surge or resonant vibration. Since these cam harmonic exciting forces decrease in amplitude as their frequencies increase, it is the usual engineering practice to design a helical coil spring to have the highest frequency obtainable, so as to be above the 9th to 11th harmonics if possible, and still keeping the operating stresses within allowable design limits. When it is found necessary to operate in the 7th to 11th harmonic range a helical coil flat wire friction damper, as illustrated in FIG. 2, is frequently used to aid in damping out e spring surge.

The natural spring frequency is directly related to its operating stresses and inversely to the valve lift, which explains why a high strength material must be used and the valve lift should be kept to tee minimum acceptable valve for good engine breathing. The commonest spring material being used today is carbon steel valve spring quality wire, to commercial specification ASTM-A230-63T, which is rated at a minimum tensile strength of 220,000 pounds per square inch. Chrome-vanadium and chrome-silicon alloy steel wires are occasionally used in high performance engines, as they offer a marked improvement in minimizing load relaxation at elevated temperatures and some improvement in tensile strength. For optimum engine breathing the valve lift is required to be about 25 percent of the port diameter. Larger diameter valves and ports require higher valve lifts imposing further limitations on the desired high magnitude to the valve spring frequency.

With high valve lifts currently being used it appears that the engine speeds have exceeded the limits of satisfactory performance attainable with the use of helical coil springs. Thus valve gear motion and load distortions are clearly evident at high engine speeds from oscillograms which are capable of being produced by an engineer skilled in the art of making high speed dynamics measurements of valve gear performance. Further, with erratic valve spring operation, engine noise is excessive, particularly at certain critical engine speeds where the lower order cam harmonics excite the spring into resonant vibration. Still further, durability of valve seats and tappet faces declines rapidly at high engine speeds with poor spring performance. And still further, when using hydraulic adjusters or lifters, pump-up or lifter malfunction is experienced at the critical engine speeds when severe spring surge occurs. Therefore, a novel valve spring capable of overcoming these and other problems would provide a substantial advancement to the art.

Accordingly, objects of this invention are to provide a novel dual beam valve spring which is free of surge at normal engine speeds and substantially free of surge at any engine speed within the scope of today's art; that is economical to manufacture, and has a number of other advantages that will become evident to the artisan from the following disclosure.

THE INVENTION—FIGS. 1

FIG. 1 illustrates the invention in perspective which comprises a pair of cantilever beam springs. This is the simplest form of the invention and is anchored to a base at the thick ends so that the thin ends can be deflected to produce a force to return the valve to its seat. By optimum processing and by working to high stresses the spring becomes a very high frequency spring resulting in negligible spring surge even at maximum engine operating speeds. The forward beam 28 is illustrated with a round pocket 30, essentially pinning the spring to the valve retainer with the use of a small steel ball; whereas the rear beam 29 is shown with an elongated pocket 31 permitting the retainer to oscillate relative to the spring thereby eliminating any binding forces which can be caused by the spring tips traveling through an arcuate path.

Figure 3:
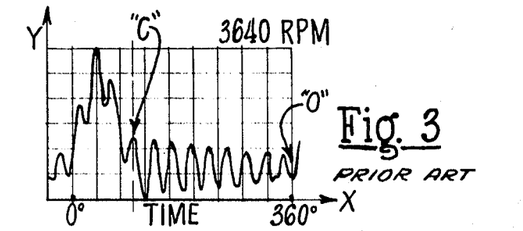
FIG. 3 is a typical oscillogram of actual spring loading during engine operation using the prior art spring only of FIG. 2, without the damper, made at 1,820 camshaft r.p.m. or 3,640 engine r.p.m.
Figure 4:
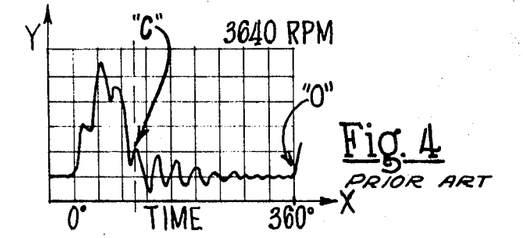
FIG. 4 is another typical oscillogram of the spring loading during engine operation with the prior art helical coil spring and damper in combination of FIG. a, run at the same speed.

THE PROBLEM REITERATED—FIGS. 2, 3 & 4

FIG. 2 illustrates a typical conventional helical coil valve spring 32 as used today in a modern internal combustion engine. In some instances the damper 33 is inserted into the spring 32 and the two are used in combination.

FIG. 3 is an oscillogram showing the spring loading during actual engine operation of the helical coil spring 32, only. Here at 3,640 engine r.p.m. the valve spring vibrates at its natural frequency of 21,800 cycles per minute resulting from resonant excitation with the 12th cam harmonic, i.e. (21,800×2/3640=12. It will be noted from FIG. 3 that the spring 32 surges at a high amplitude after the valve is closed, e.g. at position "c." It is to be further noted that the surge does not subside entirely before the subsequent valve opening as indicated at position "o." This surging imparts vibration to the valve gear, induces high engine noise, and results in rough high speed engine operation. A surging valve spring also has an adverse effect on the performance of hydraulic valve lifters since the malfunctioning valve gear causes them to pump-up resulting in loss of engine power. Valve life is also reduced. This oscillogram illustrates an engine speed of only 3,640 r.p.m. which is a relatively low speed by today's state of the art; however, it does show the restrictions imposed on high speed engine operation by the helical coil valve spring of the present art.

The combination of the damper 33 and the helical coil spring 32 of FIG. 2 provides some reduction of spring surge and some improvement to engine operation. This is illustrated in the oscillogram of FIG. 4 which also represents spring loading at 1,820 camshaft r.p.m. and 3,640 engine r.p.m. In FIG. 4, the spring surge is damped out at this speed just before the valve open position "o." However, there is still substantial surge during the valve open interval and for a part of the time when the valve is seated, between the valve closed position "c." and the valve open position "o." Thus, while there has been some observable improvement, valve operation is a long way from being ideal, because of the existence of spring surge even at this relatively low speed. At higher engine speeds the spring surge becomes much more pronounced and the effectiveness of the damper is minimized so that the spring surge may not be completely damped out before the valve is opened again.

Figure 5:
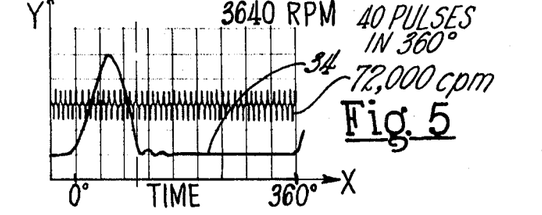
FIG. 5 is a typical oscillogram of the spring loading of the dual beam spring of the present invention, during operation at 3,640 engine r.p.m. showing the complete absence of spring surge; a reference frequency of 72,000 c.p.m. has been superimposed upon the oscillogram.
Figure 6:
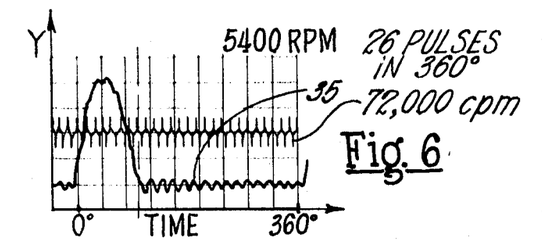
FIG. 6 is another typical oscillogram of the spring loading of the dual beam spring during operation at 5,4000 engine r.p.m. and now showing the presence of a very small amplitude of spring surge; a reference frequency of 72,000 c.p.m. has been superimposed upon the oscillogram.

THE IMPROVEMENT PROVIDED BY THE PRESENT INVENTION—FIGS. 5 & 6

FIG. 5 is a typical oscillogram showing the beam spring loading during engine operation at 3,640 engine r.p.m. using a beam spring with a typically high frequency of 62,000 c.p.m. A reference frequency of 72,000 c.p.m. has been superimposed on FIG. 5 for comparing the vibration frequency of the spring. This beam spring has the same load-deflection characteristics as the helical coil spring which it replaces and is designed to be within acceptable stress values so as not to exceed the endurance strength limits of the steel spring material. The helical coil spring previously described had a frequency of only 21,8000 c.p.m. whereas the beam spring which replaces it has a frequency approximately three times greater. The result of this high natural beam spring frequency is clearly evident from FIG. 5 in that the valve spring load curve now appears as a valve displacement curve 34, being smooth and essentially free of vibration during the valve lift cycle and during the valve closed period. This illustrates a large contrast to the vibrations observed on the oscillograms of FIGS. 3 and 4. The complete absence of surge in the beam spring is due to the fact that at 3,640 engine speed it is being excited by the 34th cam harmonic, which is now effective and has insufficient amplitude to induce any surge to the beam spring, i.e. (62,000×2/3640=34.

FIG. 6, which is another typical oscillogram showing the loading of the beam spring and illustrates operation at a much higher engine speed of 5,4000 r.p.m. A reference frequency of 72,000 c.p.m. has been superimposed on FIG. 6 for comparing the vibration frequency of the spring. It now shows the presence of a very small amplitude of spring surge 35 due to the 23rd cam harmonic, which is now effective and has only sufficient magnitude to induce the limited vibration observed. The engine using helical coil springs was inoperable at this high speed due to severe valve gear noise. Under the conditions provided by the present invention, engine operation is appreciably smoother and the noise level is substantially reduced. This results in improved high speed valve gear dynamics and improved hydraulic valve lifter action when it is employed in the valve gear.

Figure 7:
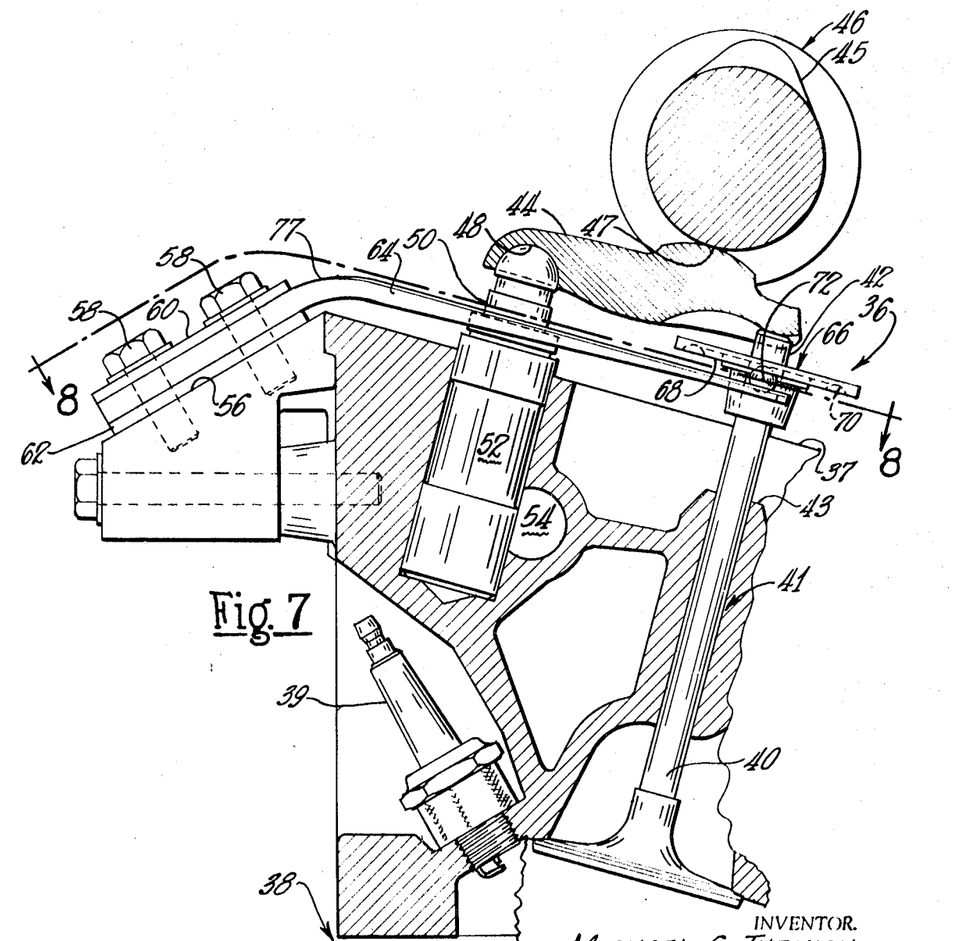
FIG. 7 is a fragmentary side elevational view, with some parts in section, showing a dual beam valve spring of the present invention introduced into the environment of an overhead camshaft automobile engine.
Figure 8:
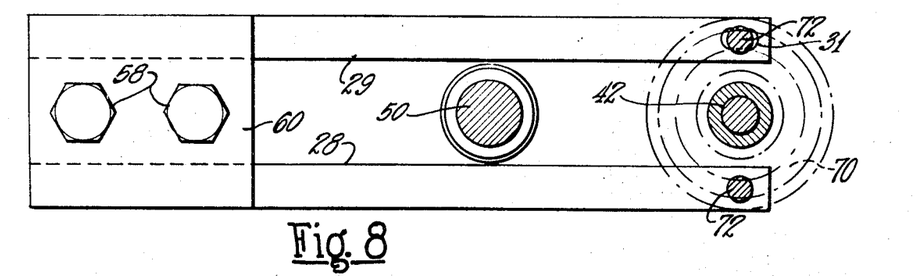
FIG. 8 is a top plan view taken along the line 8—8 of FIG. 7.

THE INVENTION IN ITS ENVIRONMENT—FIGS. 7 & 8

An overhead camshaft engine head 36 forms the environment for the present invention in FIGS. 7 and 8. This illustration is of an actual structure and head 36 includes a head casting 37 that supports the various valve gear components and forms the top end of the combustion chamber for the cylinders and pistons included in the engine block 38 below.

A spark plug 39 is illustrated in its working relationship to the valve 40, both of which are positioned at the top of a cylinder of the engine block 38. The valve 40 reciprocates in a cylindrical guideway 41 and extends above the top of the valve guide 43 so that the stem end 42 engages a rocker arm 44. The rocker arm 44 contacts a cam 45 of the overhead camshaft 46 at a point 47. At the other end, the rocker arm 44, by means of a socket 48, resets on top of the plunger 50 of a hydraulic lash adjuster 52. The hydraulic lash adjuster 52 receives pressurized oil from the engine lubrication system from port 54 and is effective in maintaining zero clearance at the contact point 47 of the rocker arm 44 and the cam 45. All of the foregoing are known and are only described to explain this particular valve gear arrangement.

In accordance with this invention, a flat land 56 is provided off to one side of the head casting 37 in alignment with the valve 40 and is threaded to receive bolts 58 also shown in FIG. 8. The bolts 58 pass through spacer and clamp plates 60 and 62 that space and hold a pair of beam springs 64 of the present invention by the base ends thereof. This is effective to provide a dual beam valve spring 28 and 29 of the present invention shown in FIGS. 1 and 8.

Adjacent to the stem end 42 of the valve 40, a conventional retainer 66 is utilized, but with a slight modification to the underside of the annular flange 68. Thus an endless groove 70, (or a pocket 82 or an elongated pocket 83 shown in FIGS. 11 and 13) is provided in order to receive an engagement ball 72 that is utilized in this particular embodiment of the dual beam spring 28–29. These are shown more clearly in FIGS. 10, 11, 12 and 13 described later.

Figure 9:
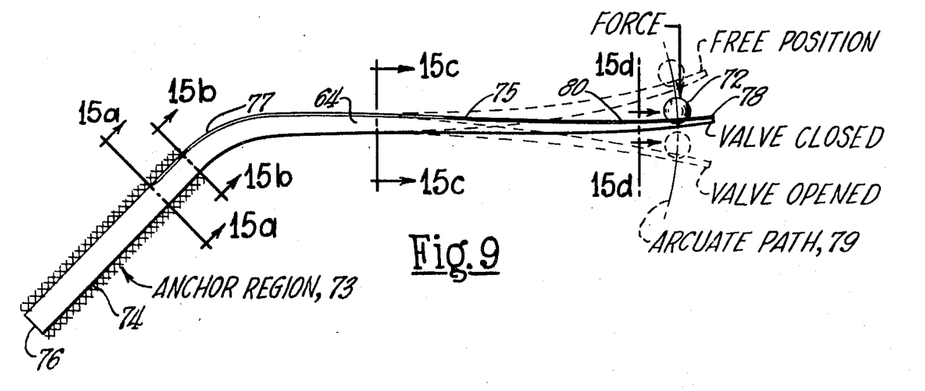
FIG. 9 is a side elevational view of an individual beam spring of this invention.

THE CANTILEVER BEAM OF THE INVENTION—FIG. 9

FIG. 9 illustrates in side elevation the profile 64 of a single beam spring 28 or 29 of the present invention, in several positions and anchored in region 73. The free position is shown uppermost in FIG. 9. The valve closed position is next lower, beneath the free position; and the valve open position is lowermost.

It will be noted that the rear end 74 of the beam spring 64 is canted downwardly at about 30° from the horizontal in its installed position previously shown in FIG. 7, and about 45° from the flexing portion 75 of the valve closed position shown in FIG. 9. This rear section 74 is generally rectangular in cross-sectional shape and of substantially constant thickness from the very end 76 substantially as far as the section line 15a—15a. From about the section line 15a—15a, the thickness starts to decrease gradually through the bend area 77 and continues to gradually and uniformly decrease to the tip end 78. The width of the beam 64 as illustrated in FIG. 8 is essentially constant though it may vary somewhat in width as when manufacturing economics suggest it, or perhaps when installation limitations indicate that such is desirable.

From the foregoing it will be understood that a single-beam spring 64 of this invention is an elongated resilient member having generally constant width, and a gradual uniformly changing thickness to produce essentially a constant stressed cantilever beam spring. More will be made of the novel features later such as the cross-sectional configuration under the description of FIG. 15, the longitudinal taper by FIGS. 18 and 19 and the design formulas by FIG. 20.

Figure 10:
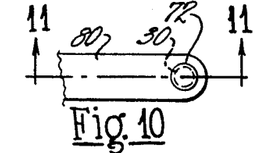
FIG. 10 is a fragmentary top plan view of a typical tip of the beam spring of FIG. 9.
Figure 11:
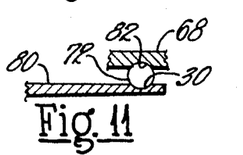
FIG. 11 is a fragmentary sectional view of the tip of the beam spring of FIG. 9, taken along the line 11—11 of FIG. 10.

Within the scope of the invention the tip end 78 can take several configurations. Thus as shown in FIGS. 10 and 11 a concave recess 30 is provided in the upper surface 80. The ball 72 of FIGS. 7, 9 and 11 is seated in the recess 30 to provide lifting contact against the flange 68 of the retainer 66 as shown. Recess 30 is shown as confining ball 72 from any motion and by providing a similar recess 82 in flange 68 the spring tip is essentially pinned to the retainer. As a result the retainer and the valve will be required to oscillate about the valve centerline axis depending upon the arcuate motion 79 of the spring top as it goes through the valve lift cycle.

Figure 12:
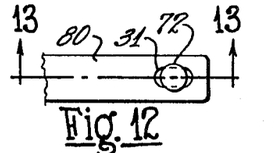
FIG. 12 is a fragmentary top plan view of another typical tip of the beam spring of FIG. 9.
Figure 13:
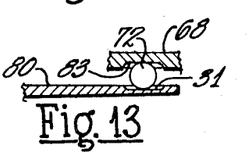
FIG. 13 is a fragmentary sectional view of the tip of the beam spring of FIG. 9 taken along the line 13—13 of FIG. 12.

Additionally the tip end may be permitted to move relative to the retainer, by adopting the configuration shown in FIGS. 12 and 13, and providing an elongated concave recess 31 in the upper surface 80 of the spring top. Using a similar recess 83 in the flange 68 the spring tip is allowed some relative freedom of axial movement since the ball 72 can roll in the recesses 31 and 83.

Further, an endless groove 70 may be employed as shown in FIG. 7 to radially confine the contacting ball 72 and still permit relative motion between retainer flange 68 and the spring tips as they travel through an arcuate path.

Figure 14:
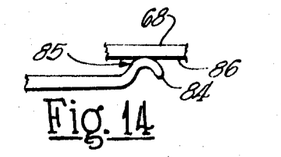
FIG. 14 is a fragmentary side elevational view of another form of tip treatment for a beam spring of this invention.

Alternately the top end of the spring may be formed into a convex contacting lip 84 as shown in FIG. 14. The convex upper surface 85 of the lip 84 provides contact with the lower side 86 of the retainer flange 78. When the tip structure of FIG. 14 is used, the lower side of flange 68 may be smooth as distinguished from the endless groove 70 or the concave pockets 82 and 83 when the ball 72 is employed.

Other tip structures may be employed, additionally to those explained, depending upon the type of action desired at the retainer-spring contacting region as will become readily apparent to the artisan versed in valve gear mechanics.

Figures 15, 16, 17:
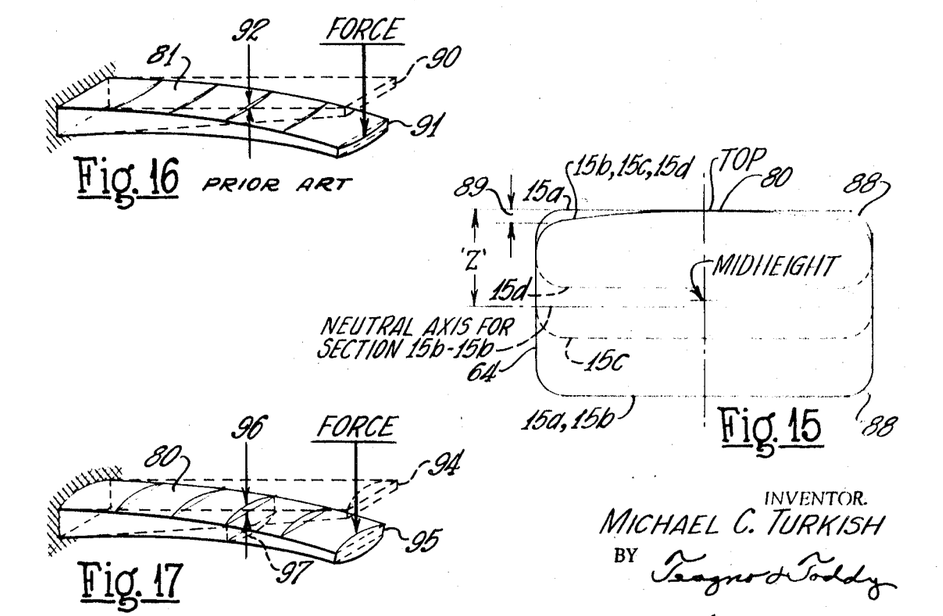
FIG. 15 is a composite cross-sectional view of the beam spring of FIG. 9 taken at the lines 15a—15a, 15b—15b, 15c—15c, and 15d—15d.
FIG. 16 is a perspective view of a cantilever beam, having a rectangular cross section, illustrating the concave traverse profile curvature induced at the top surface, due to anticlasitc bending, when the tip is loaded.
FIG. 17 is a perspective view of a cantilever beam having a modified rectangular cross section which has a crowned top surface as employed in the present invention to illustrate that the top transverse profile curvature remains convex, even with anticlasitc bending effects when the tip is loaded.

THE CROSS-SECTIONAL CONFIGURATION OF A BEAM SPRING—FIG. 15

FIG. 15 is here considered with FIG. 9 for a description of the cross-sectional configuration of an individual beam spring 64 of this invention. As shown in FIG. 9, the section line 15a—15a is taken through the maximum thickness part of the beam spring in the anchor region 73. This section is represented by uppermost and lowermost lines 15a—15a in FIG. 15 which include a radius 88 provided at each corner. Similarly section line 15b—15b is located in the top transverse crowned region just outside of the anchor region and in FIG. 15 the height of the crown 89 is apparent. The purpose of this crown height 89 to top surface 80, and the top corner radii 88 is to prevent stress buildup in the corner areas and instead to have the highest tensile stress be developed in the middle of the crown where there is no surface discontinuity. Actual tests of many springs in an engine have demonstrated the importance of this transverse crown on the top surface to achieve excellent durability. Without this top transverse crown the fatigue properties of the spring are inferior due to anticlastic bending effects which occur and are explained later with the aid of FIGS. 16 and 17. It seems to be in order here to define anticlastic as meaning: "having opposite curvatures at a given point, that is, curved convexly along a longitudinal plane and concavely along the perpendicular section." The crown height 89 must be sufficiently large so that the top surface always retains a transverse convex profile 80 regardless of the amount of arch 77 induced during forming and the additional amount of anticlasitc bending effect developed during flexing.

The section line 15c—15c of FIG. 9 is taken in the midregion of the beam spring and the related section in FIG. 15 illustrates the top transverse crown profile and the gradual reduction of the spring thickness from the anchor region to obtain a uniformly stressed spring. This gradual reduction in thickness is continued out to the top end 78 to keep the spring as uniformly stressed as practical, and the section line 15d—15d taken near the top end and its associated section in FIG. 15 shows this reduced thickness.

ANTICLASTIC BENDING EFFECT NULLIFIED IN BEAM SPRING—FIGS.

FIG. 16 illustrates the usual approach to designing a uniformly stressed cantilever beam with the rectangular end section 90 representing an unloaded horizontal tapered member. When a force is applied centrally at the tip end it deflects into the lower position 91 and the top surface 81 takes on a transverse concave profile 91 as illustrated. This concave surface height 92 causes the maximum tensile stress to occur at the upper corners since "$Z$" is the largest dimension here for the engineering formula for stress; $S = MZ/I$. "$Z$" is the distance of the maximum tensile stressed fibers from the neutral axis. Further, the corner is a region of greater failure vulnerability since it is a region of surface discontinuity as compared to the top surface tensile stressed fibers located in midsection and away from the corners.

FIG. 17 illustrates a feature of this invention whereby the detrimental consequence on durability caused by anticlastic bending effects is nullified in the beam spring. By employing a transversely crowned convex profile height 89 to top surface 80 is excess of the total amount of anticlastic bending effects encountered, the tip end 94 and all active cross sections are no longer of pure rectangular shape.

The illustrated straight horizontal beam in FIG. 17, having variable thickness to secure uniform stresses along its length, has a top surface with a transverse convex profile 94 with the bottom surface essentially flat except for the corner radii 88 provided. Now when a vertical force is applied at the tip end it deflects into the lower position 95 and the top surface 80 still retains some convex curvature of a height 96 even through some convex curvature has been induced into the lower surface 97 due to anticlastic bending effects. The presence of this upper transverse convex curvature now causes the maximum tensile stress to occur in the midregion of the top surface where there is no surface discontinuity. Here "Z" is the largest for the formula $S=MZ/I$. This principle of providing a transversely crowned profile to the top tensile stressed surface is sound in principle and has proven to be most essential in securing unlimited fatigue life for many springs tested on an actual engine in a testing laboratory.

It is important to observe that anticlastic bending effects occur both during the forming operation to obtain the initial shape, as in the arched region comprising the longitudinal arc 77 of FIGS. 7, 9, 21, 22 and 23, and during the flexing of the spring through the arcuate path 79. Sufficient crown height 89 must be provided to the beam spring so that in the final configuration no tensile stressed surfaces develop into transversely concave crowned surfaces.

A particular spring built up and tested for durability had an active length of 4.50 inches, a uniform width of 0.375 inch, a maximum thickness of 0.200 inch, an outer radius of curvature to arch 77 of 1.00 inch, a flexed distance at the load point of 0.80 inch, and corner radii 88 of 0.030 inch. A crown height 89 of 0.015 inch for this spring proved to be adequate in retaining a transverse convex crown to the top surface 80 at all times. Different spring dimensions may allow slightly lower crown heights to be used, however, it is desirable to provide a few thousandths excess crown height to ensure that it is more than sufficient to guard against developing true anticlastic deformation at the cortical tensile stressed surfaces. A minimum crown height of about 0.010 inch and a minimum corner radius of about 0.020 inch are considered practical lower limits. The crowned structure illustrated in FIG. 15 with the corner radii 88 has proven to have unusually high durability and has made practical an unusually high natural frequency beam spring, and provides a definite advance to the art in the structure forming this invention.

Figures 18, 19:
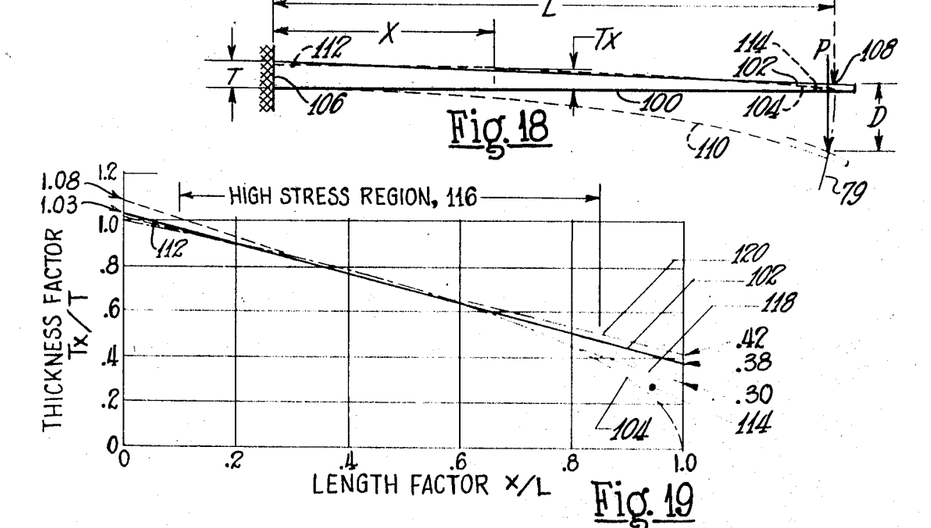
FIG. 18 is a side elevational view of a simple form of an individual straight cantilever beam spring to explain the longitudinal configuration.
FIG. 19 is a nondimensional graphical plot of the thickness versus length of the beam spring.

THE LONGITUDINAL CONFIGURATION OF A BEAM SPRING—FIGS. 18 and 19

In order to fully explain the principle of optimumly stressing a cantilever beam spring to achieve the highest natural frequency possible FIGS. 18 and 19 are presented. FIG. 18 illustrates a simple form of a straight cantilever beam spring with a force "P" applied near the tip of the free end. Upon the application of force "P" the reference line 100 flexes into position 110 with the load point moving through the arcuate path 79. A constant width is assumed although a small width variation may be similarly considered. Now for convenience in this description the variable thickness in the longitudinal profile is achieved by making one edge straight, lower line 100, and the other variable, upper line 102. This results in the uniformly variable thickness to the longitudinal profile of the active portion of this invention. This line 102 representing uniform beam taper is illustrated for more detail on the nondimensional plot of beam spring thickness versus length in FIG. 19.

To achieve a theoretically uniformly stressed beam in bending the top profile line would be a parabolic curve 104 which gives a maximum thickness at the anchor point 106 and zero thickness at the point of load application 108. Such a beam is obviously weak at the extreme ends; at the anchor end 106 due to an abrupt change stress gradient and at the tip end since material is lacking to handle shear stresses and stress concentrations at the point of load application 108. This points to the need to modify the parabolic profile to achieve optimum stress distribution by increasing the beam thickness somewhat gradually at both ends as designated by areas 112 and 114. Further, to retain the same rate characteristics a small amount of material is removed in the central high stressed region. This region covers about 75 percent of the active length of the beam spring and contains no abrupt longitudinal stress gradient. The uniform taper line 12, used in the following formula development and test samples, resulted in a 3 percent increased thickness at the anchor and a tip thickness which is 38 percent of the theoretical anchor thickness. Alternate taper lines 118 and 120 are shown on FIG. 19 to define practical limits and these result in a range of 2 to 8 percent thickness increase at the anchor and a tip thickness of 30 to 42 percent of the theoretical anchor thickness.

This suggested novel means of attaining optimum utilization of the spring material by modifying the beam thickness along its length in accordance with the ability of the material to carry the existing stresses and by providing a transversely crowned top surface, produces an unusually high natural frequency beam spring with excellent fatigue durability. Such a spring, when used as a valve spring in a modern internal combustion engine, can provide satisfactory spring operation without undue spring surge above today's maximum speeds of 7,000 or 8,000 engine r.p.m. It is obvious without the need for much explaining that these high performance spring characteristics can only be achieved by adopting the best processing procedures to combine the best surface qualities, material resiliency, residual stresses and absence of surface corrosion. This requires that the spring material employed be free of detrimental seams and inclusions, that the surface be free of all harmful surface decarburization, that the material be processed to an optimum spring hardness for the material used, that it is suitably shot peened, and is suitably surface protected or used in corrosion free environments.

Figure 20:
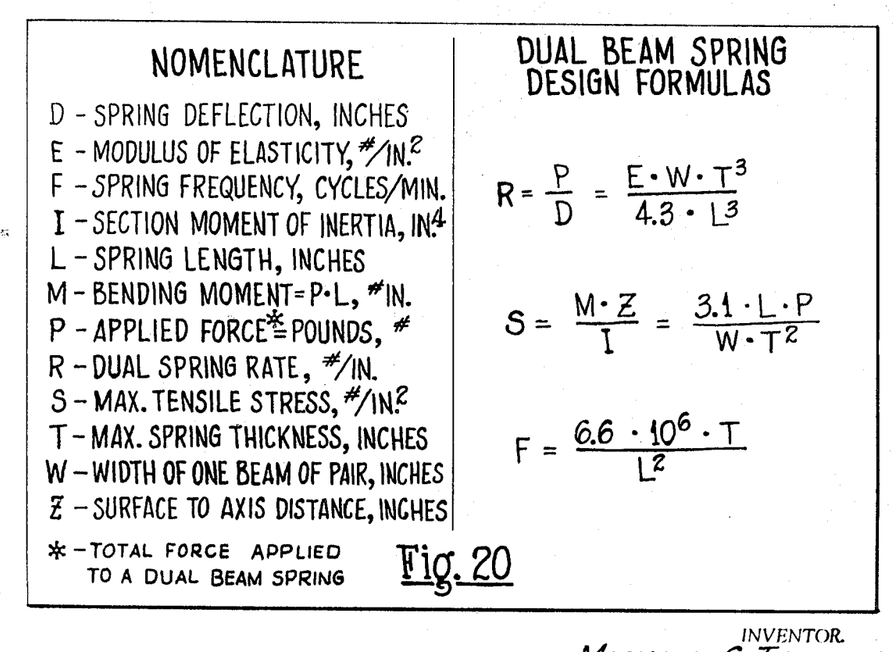
FIG. 20 is a tabulation of basic dual beam spring design formulas.

DUAL BEAM SPRING DESIGN FORMULAS—FIG. 20

FIG. 20 presents a summary of the basic dual beam spring design formulas of the types found in many books covering strength of materials. The formulas given are for:
  A. Force-deflection rate of a dual beam spring;—pounds per inch.
  B. Maximum tensile stress due to bending;—pounds per square inch.
  C. Natural frequency of beam vibration in the first MODE.—cycles per minute.

The constants appearing in each formula are based on the type of structure illustrated in FIGS. 18 and 19 using upper profile 102 and the transverse sections illustrated in FIG. 15. These formulas apply well to minor variations from FIG. 19 (FIG. 7 for example) but will require some modifications to cover the form of beam spring illustrated in FIGS. 21 and 22.

Figure 21:
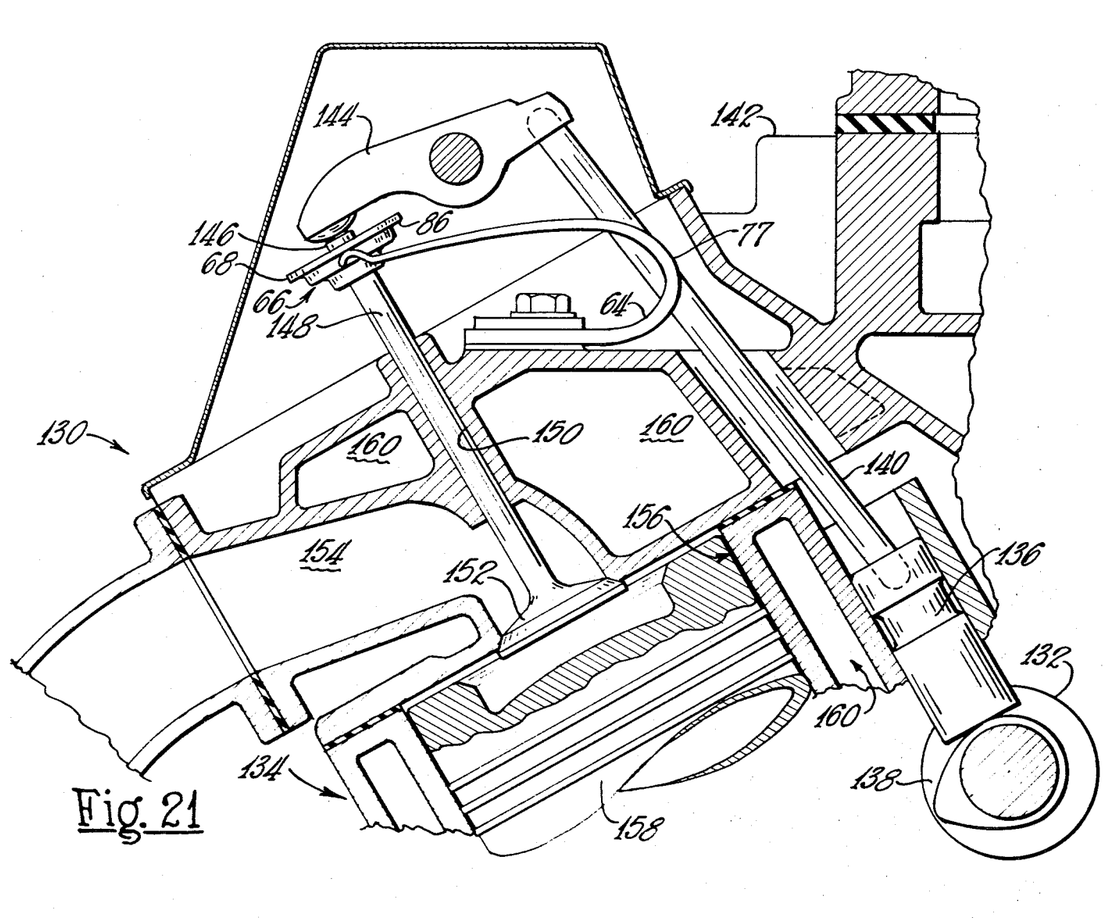
FIG. 21 is a side elevational view, partly in section, of another application of the present invention as applied to a push rod engine—i.e., with the camshaft located in the cylinder block.

THE PUSHROD ENGINE EMBODIMENT—FIG. 21

The prior description has placed the dual beam valve spring of this invention in an overhead camshaft engine environment. However, the invention has broad applicability in pushrod engines as well. The following description will bring this out more clearly and will indicate that still further and additional configurations of the dual beam valve spring are possible within the scope of the invention.

In this embodiment of the invention, the environment is that of a pushrod engine 130 wherein the camshaft 132 is located in the cylinder block 134. A hydraulic valve lifter or mechanical tappet 136 is interposed between the cam 138 and the bottom end of the pushrod 140. The pushrod 140 extends up through the cylinder head 142 to engage one end of a rocker arm 144. The rocker arm 144 is centrally pivoted in known manner. The other end of the rocker arm bears against the stem end 146 of the valve 148 which reciprocates in a valve guide passage 150 formed in the cylinder head 142. The head 152 of the valve 148 seats to control flow to an intake or exhaust passage 154 that leads to or from the cylinder 156 above the piston 158, as the case may be. The valve head 152 is located at the top of the combustion chamber above the piston 158 of cylinder 156 as known to the art.

Passages 160 for cooling liquid are located throughout the cylinder block 134 and head 142 to conduct away heat so that the various components will be maintained within suitable temperature limits.

In this embodiment of the invention the dual arm beam spring has the same sectional configuration, constant width and gradual and uniformly longitudinally tapering thickness as described above relative to FIGS. 9, 15 and 18. Also the convex crown 15b, FIG. 15, on the outer convex (top) side of each single-beam spring 64 is maintained particularly in region 77 where the longitudinal profile radius of curvature is small. Still further, in accordance with the principles of this invention, two individual beam springs 28 and 29 of FIG. 1 are used as a pair to produce the dual-beam spring 64. The tip embodiment of FIG. 14 is employed in this instance to engage the lower side 86 of the retainer flange 68 of the valve retainer 66.

This figure of the drawings illustrates the further use of the present invention and the fact that is is quite adaptable to about the same cubic volume of space as is a helical coil spring, but does not require as much height space as a helical coil spring, and further provides superior operating results as brought out in the description of FIGS. 5 and 6.

Figure 22:
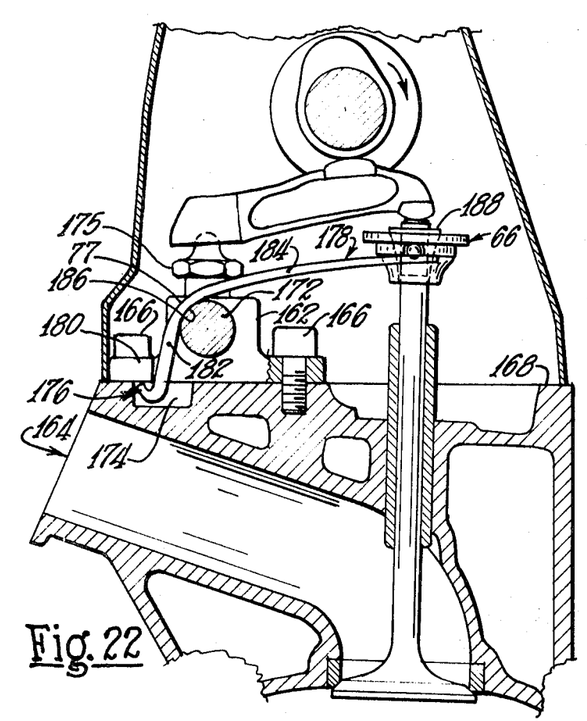
FIG. 22 is a side elevational view, partly in section, of the present invention in a preferred embodiment—because of the nonuse of mounting bolts at the anchor end.

A PREFERRED EMBODIMENT OF THE INVENTION—FIG. 22

FIG. 22 illustrates the application of the invention to an engine in a manner whereby the bolt hold down construction as shown in FIGS. 7 and 8 is replaced by a three pint retaining means. This actually illustrates the modification of a stock engine to accommodate the present invention. Thus a block 162 is attached to the top of the engine head 164 by bolts 166. This scheme of attaching a separate block 162 to support the rocker arm pivot and mechanical adjuster 175 and beam spring inner anchor support 172 is desirable because it permits milling the top surface 168 flat in a production of the engine head 164 for the attachment of other components. The retaining block 162 provides, in addition to support for the lash adjuster 175 and inner anchor support 172, an abutment 180 to serve as an outer anchor to the hooked end 176 of the beam spring 178. A cavity 174 is provided in engine head 164 so that the outer anchor end 176 may be inserted to act against abutment 180. Thus the short stiff portion 182 of beam spring 178 is securely anchored. It should be apparent that the portion 182 has a maximum thickness and that the hooked end 176 and the valve-engaging end of the spring 178 have a thinner thickness than the midregion 182. This arrangement makes installation of the dual beam an easy operation by first inserting the hook end 176 into cavity 174 against abutment 180. Then by making contact at point 186 with inner anchor support 172 the tip of the active segment 184 may be flexed sufficiently to install the retainer 66 and keys 188. During valve lift a small amount of flexing will occur in the short arm 182; however, the major portion of the total spring flexure will occur in the long active segment 184 to provide the desired high frequency characteristics of the beam spring as previously described relative to FIGS. 7, 9 and 21.

Figure 23:
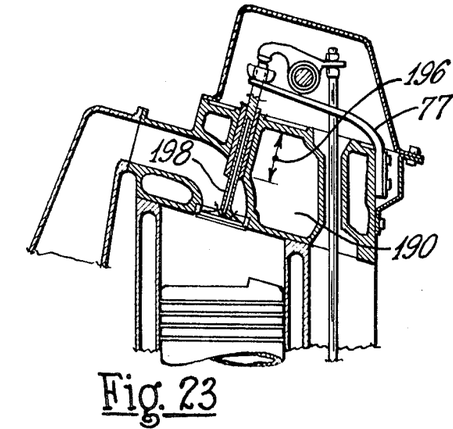
FIG. 23 illustrates an application of the invention to a heavy duty pushrod engine, such as a truck or bus application, resulting in increased water jacket valve stem cooling made possible by the low profile of the invention.
Figure 24:
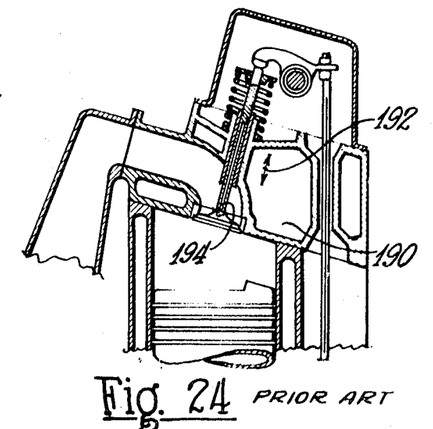
FIG. 24 is presented for comparison and is analogous to FIG. 23, but showing the reduced water jacket cooling provided when a conventional prior art helical coil valve spring is used.

EXTENDED SCOPE OF THE INVENTION—FIG. 23 and 24

FIG. 23 of the drawings illustrates the application of the dual beam valve spring of the present invention to a heavy duty engine such as for a truck or bus application. It shows that the low profile height of the beam spring can be used advantageously to either lower the overall engine height or as illustrated to improve the valve stem cooling, particularly of a sodium cooled exhaust valve.

FIG. 24 of the drawings illustrates, for comparison with FIG. 23, a similar engine employing conventional helical coil valve springs. In order to maintain a reasonably low engine height the cylinder head height and cover are restricted so that the extent of valve guide cooling by the water coolant 190 in region 192 is limited. This valve stem cooling limitation, particularly for the exhaust valve, results in unduly elevated valve head temperatures, even when sodium coolant is used in the valve cavity 194.

Since the profile height of the beam spring of the present invention as shown in FIG. w3 is substantially lower than with a helical coil valve spring, the valve stem cooling can be substantially improved by increasing the height of heat transfer region 196 as compared to region 192 of FIG. 24. Now the improvement of heat transfer from exhaust valve stem 198 to the coolant 190 lowers the valve head and valve seat temperatures noticeably to result in improved valve life and overall engine durability.

From the foregoing it will be evident that the present invention provides substantial absence of spring surge at the 23rd and 34th harmonics. This is greatly in excess of the 11th harmonic encountered in the use of helical coil springs, as described hereinbefore. Therefore, it is logical that higher engine speeds can be achieved and operation provided at much lower cam harmonics than those recited above. This can still provide operation above the critical 11th to 13th cam harmonics which are usually encountered in helical coil spring designs. Accordingly, the 15th harmonic would be a logical lower limit at which to operate a beam spring without resorting to damping techniques of any kind.

In short, the present invention discloses a beam spring having a high natural frequency, so high in fact that cam harmonics below the 13th or 15th never appear even at maximum engine operating speed. This means that at the 13th harmonic, for example, an engine operating at 10,000 r.p.m. will require a valve spring of 65,000 cycles per minute. This is the very practical limit. Even at the 15th harmonic, $F = 10,000/2 \times 15 = 75,000$ cycles per minute is still a reasonable contemplation within the scope of the present invention.

While I have described my invention and have shown a suitable structure in detail, various modifications can readily be incorporated, depending upon mounting requirements and manufacturing needs, without departing from the scope of this invention.

What I claim is:

1. In a valve gear including a valve and means for opening the valve, the improvement of a valve spring comprising an elongated beam spring having an anchored end with limited flexibility, and a thinner flexible valve-engaging end, said beam spring being of constant width and having a tapering thickness to both ends from a midregion of maximum thickness, means securing the anchor end in cantilevered relationship relative to the valve and attachment means coupling the valve engaging end of sad beam spring to said valve, to force the valve toward a closed position.

2. A spring in a valve gear including a valve and a cam as part of the valve gear, for opening the valve, said spring comprising a tapered, single-leaf elongated beam having a base end fastened to a support in cantilevered relationship the other end being engaged with the valve to be moved, so as to cause spring flexure, said elongated beam having uniform width throughout the active length thereof, and being of uniformly changing thickness in the active length between the ends with the greater thickness being located at the anchored end; said beam having a vibration frequency of sufficient magnitude that in its application, it will only be excited by cam harmonics above the 15th order of magnitude.

3. In a valve gear for an engine including a valve and means for opening the valve, the improvement of a valve spring for closing the valve, comprising an elongated beam having a thick base end and a thinner valve-engaging end, said beam being of a constant width and having a tapering thickness over a greater portion of its length to comprise the active segment, said elongated beam having a cross-sectional configuration of general rectangular shape and including upper and lower major surfaces, the upper major surface being in tension in the installed configuration of the spring, and at least said major surface in tension having transverse convex curvature and corner radii, means securing the base end to said engine in cantilevered relationship to the valve, and contact means at the valve-engaging end of said beam spring engaging said valve to force the valve toward a closed position.

4. In a valve gear for an engine including a valve and means for opening the valve, the improvement of the valve spring for closing the valve, comprising an elongated beam having a thick base end and a thinner valve-engaging end, said beam being of constant width and having a tapering thickness over a greater portion of its length to comprise the active segment, said active segment of said elongated beams having a longitudinal profile generally tapered uniformly from the thick base end to the thinner valve-engaging end and every cross section of this tapered segment is of generally rectangular shape, the upper surface being under tensile stress in use, the tensile stress surface having transverse convex curvature and corner radii, means securing the base end to said engine in cantilever relationship to the valve, and contact means at the valve-engaging end of said beam spring engaging said valve to force the valve toward a closed position.

5. The invention of claim 4 wherein the longitudinal profile of said active element of said elongated beam spring is generally tapered uniformly from the thick base end to the thinner valve engaging end to the degree that the thick end is 2 to 8 percent thicker than an equivalent constant stress beam having the same rate and the thin end thickness at the valve engaging end is 30 to 42 percent of the thick end theoretical thickness and every cross section of this tapered element is generally of rectangular shape, the tensile stressed surface having a transverse convex curvature with a height of at least about 0.010 inch and a corner radius of at least about 0.020 inch.

6. In a valve gear including a valve and valve means for opening the valve, the improvement of a valve spring for closing the valve, comprising: two elongated beam springs positioned in spaced relationship each having a thick base end and a thinner valve-engaging end, each of said elongated beam springs having a cross-sectional configuration of generally rectangular shape and including upper and lower major surfaces, the upper major surfaces being in tension in the installed configuration of the spring, and at least said major surfaces in tension having transverse convex curvature and corner radii, means securing the base ends in cantilevered relationship relative to the valve, and attachment means coupling the valve-engaging end of said beam springs to said valve to force the valve toward the closed position, and each of said beam springs being of constant stress.

7. In a valve gear including a valve and means for opening the valve, the improvement of a valve spring for closing the valve, comprising: two elongated beam springs positioned in spaced relationship, each having a thick base end and a thinner valve-engaging end, said elongated beam springs having a constant width and uniformly changing thickness in the active portion between the ends with the greater thickness at the base ends, each of said beam springs having a cross-sectional configuration of generally rectangular shape and including upper and lower major surfaces, the upper major surfaces being in tension in the installed configuration of the spring, and at least said major surfaces in tension having transverse convex curvature and corner radii, means securing the base ends in cantilevered relationship relative to the valve, and attachment means coupling the valve-engaging end of said beam springs to said valve to force the valve toward a closed position, and each of said beam springs being of constant stress.

8. In a valve gear including a valve and means for opening the valve, the improvement of a valve spring comprising an elongated beam spring having an anchored end with limited flexibility, and a thinner flexible valve-engaging end, said beam spring being of constant width and having a tapering thickness to both ends from a midregion of maximum thickness, both end segments of said beam spring charging uniformly in thickness between each end and the thick midregion and said spring having a cross-sectional configuration of each segment thereof of generally rectangular shape and the upper surface being in tension, said tension surface having transverse convex curvature and corner radii, means securing the anchor end in cantilevered relationship relative to the valve and attachment means coupling the valve-engaging end of said beam spring to said valve, to force the valve toward a closed position.

PO-1050
(5/69)

UNITED STATES PATENT OFFICE
CERTIFICATE OF CORRECTION

Patent No. 3,602,205      Dated 8/31/71

Inventor(s) Michael C. Turkish

It is certified that error appears in the above-identified patent and that said Letters Patent are hereby corrected as shown below:

| | |
|---|---|
| In the Abstract, line 11: (In the spec., line 11) | After "adaptability" insert---of application---. |
| Col. 1, line 17: (Pg. 1, line 17) | "Vale" should read---valve---. |
| Col. 1, line 62: (Pg. 3, line 4) | "e" should read---the---. |
| Col. 1, line 66: (Pg. 3, line 8) | "tee" should read---the---. "valve" should read---value---. |
| Col. 2, line 47: (Pg. 4, line 30) | After FIG "a" should read---2---. |
| Col. 2, line 54: (Pg. 5, line 7) | "5,4000" should read ---5,400---. |
| Col. 3, line 64: (Pg. 8, line 5) | After "x 2" insert -)- parenthesis--x2)---. |
| Col. 4, line 19: (Pg. 9, line 6: | Delete "out". |
| Col. 4, line 35: (Pg. 9, line 17) | "21,8000" should read ---21,800---. |
| Col. 4, line 47: Pg. 9, line 29) | Insert parenthesis -)- after "x2". |
| Col. 4, line 51: (Pg. 10, line 3) | "5,4000" should read---5,400---. |

---continued---

3,602,205

(2)

continued----

| | |
|---|---|
| Col. 5, line 5:<br>(Pg. 11, line 1:) | "resets" should read---rests---. |
| Col. 5, line 71:<br>(Pg. 13, line 6) | "top" should read---tip---. |
| Col. 5, line 75:<br>(Pg. 13, line 10) | "top" should read---tip---. |
| Col. 6, line 8:<br>(Pg. 13, line 18) | "Top" should read---tip---. |
| Col. 6, line 11:<br>(Pg. 13, line 21) | "78" should read---68---. |
| Col. 6, line 56:<br>(Pg. 15, line 6) | "top" should read---tip ---. |
| Col. 6, line 58:<br>(Pg. 15, line 8) | "top" should read---tip---. |
| Col. 6, line 62:<br>Pg. 15, lines 10 and 11) | After "SPRING-FIGS." insert---<br>16 and 17---. |
| Col. 7, line 7:<br>Pg. 16, line 1) | "is" should read---in---. |
| Col. 7, line 16:<br>(Pg. 16, line 10) | "through" should read---though---. |
| Col. 7, line 18:<br>(Pg. 16, line 12) | "antielastic" should read---<br>anticlastic---. |
| Col. 7, line 40:<br>(Pg. 17, line 3) | After "inch" second occurrence,<br>the comma (,) should be a period(.) |
| Col. 7, line 47:<br>(Pg. 17, line 9) | "cortical" should read---critical---. |
| Col. 8, line 6:<br>(Pg. 18, line 11) | After "change" insert ---in---. |
| Col. 8, line 16:<br>Pg. 18, line 21) | "12" should read---102---. |
| Col. 9, line 30:<br>(Pg. 21, line 14) | "is" should read---it--- |
| Col. 9, line 41:<br>Pg. 21, line 22) | "pint" should read---point---. | continued--- continued---

| | |
|---|---|
| Col. 9, line 48: (Pg. 22, line 1) | after "production" insert---operation---. |
| Col. 10, line 15: (Pg. 23, line 7) | "w3" should read---23---. |
| Col. 10, line 60: (Claim 1, line 9) | "sad" should read---said---. |
| Col. 12, line 35: (Claim 8, formerly Claim 20, line 7) | "charging" should read---changing---. |

Signed and sealed this 29th day of February 1972.

(SEAL)
Attest:

EDWARD M. FLETCHER, JR.
Attesting Officer

ROBERT GOTTSCHALK
Commissioner of Patents